United States Patent
Miyamoto

(10) Patent No.: US 6,806,601 B2
(45) Date of Patent: Oct. 19, 2004

(54) BRUSHLESS MOTOR AND DISK DRIVE INCLUDING THE SAME

(75) Inventor: Eiji Miyamoto, Hikone (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/385,002

(22) Filed: Mar. 10, 2003

(65) Prior Publication Data

US 2003/0178904 A1 Sep. 25, 2003

(30) Foreign Application Priority Data

Mar. 20, 2002 (JP) .......................................... 2002-077860

(51) Int. Cl.⁷ ................................................ H02K 7/00
(52) U.S. Cl. ............................. 310/68 B; 310/DIG. 6
(58) Field of Search .......................... 310/68 B, 179, 310/193, 194, DIG. 3; 324/207.25, 207.2; 338/32 R, 32 H

(56) References Cited

U.S. PATENT DOCUMENTS

| | | | |
|---|---|---|---|
| 4,115,715 A | * 9/1978 | Muller | ...................... 310/68 B |
| 4,365,187 A | * 12/1982 | McDaniel et al. | ........... 318/254 |
| 4,633,110 A | * 12/1986 | Genco et al. | .................. 310/71 |
| 5,194,771 A | * 3/1993 | Otsuki et al. | .............. 310/68 B |
| 5,469,005 A | * 11/1995 | Asama et al. | .............. 310/68 B |
| 6,586,928 B1 | * 7/2003 | Reichl et al. | ........... 324/207.22 |

FOREIGN PATENT DOCUMENTS

| | | |
|---|---|---|
| JP | 08-070564 | 3/1996 |
| JP | 08-172763 | 7/1996 |
| JP | 10-108441 | 4/1998 |
| JP | 2002-191159 | 7/2002 |
| JP | 2002-250888 | 9/2002 |

* cited by examiner

*Primary Examiner*—Dang Le
(74) *Attorney, Agent, or Firm*—McCormick, Paulding & Huber LLP

(57) ABSTRACT

A brushless motor includes a rotor position detecting device disposed between stator teeth, rather than directly below a rotor magnet, so that the distance between a lower end of a rotor magnet and a stationary frame is minimized. This results in a thinner brushless motor than conventional designs. In the preferred embodiment of the present invention, the rotor position detecting device is a Hall device.

20 Claims, 3 Drawing Sheets

BRUSHLESS MOTOR AND DISK DRIVE INCLUDING THE SAME

This application is entitled to the benefit of and incorporates by reference essential subject matter disclosed in Japanese Patent Application No. 2002-077860 filed on Mar. 20, 2000.

BACKGROUND OF THE INVENTION

1. Field of the Invention

The present invention relates to brushless motors for driving storage disks, such as CD-ROM, CD-R, CD-RW, DVD-ROM, DVD-RAM, and DVD-RW. More particularly, the present invention relates to brushless motors in which magnetic field variations, generated by a rotor magnet, are detected by a rotational position detecting means that is disposed in a particular position on the stator side, such that the stator current can be switched using the detected result.

2. Background Art

As shown in FIG. 6, by way of example, a brushless motor used to drive a disk comprises a stationary frame 100, a shaft 104 rotatably supported by the stationary frame 100 through a bearing 102, a rotor 106 mounted to the shaft 104 and rotating in union with the shaft 104, a rotor magnet 108 attached to the rotor 106, and a stator 110 supported by the stationary frame 100 in a position facing the rotor magnet 108.

The stator 110 comprises a stator core 112 and stator windings 114 having, for example, 3 phases, which are wound over the stator core 112. Also, the rotor magnet 108 is magnetized with multipolar magnetization, in which the rotor magnet is magnetized into different magnetic poles alternating in the circumferential direction. The direction of current supplied to the stator winding 114 of each phase is changed in correspondence with the rotation of the rotor magnet 108. The torque of the motor is obtained through repeated attraction and repulsion between the magnetic poles of the stator 110 and the magnetic poles of the rotor magnet 108.

In order to make the brushless motor rotate, the current supplied to the stator winding 114 of each phase must be switched in sync with the rotation of the rotor magnet 108. The timing for switching the current is generated by detecting variations of a magnetic field generated by the rotation of the rotor magnet 108. The field detecting means 116 is disposed in a particular position on the stationary side. A Hall device 116 is used as one known example of field detecting means for that purpose.

The Hall device 116 generates a voltage depending on the amount of magnetic flux penetrating the Hall device. Accordingly, the greater a change in the magnitude of the terminal voltage, more precisely a change in the amount of magnetic flux penetrating the Hall device can be measured with higher sensitivity. In the brushless motor, variations of magnetic flux caused by the rotation of the rotor magnet 108 are detected by the Hall device 116 that is disposed in a particular position on the stationary side. Detection sensitivity in the rotor rotation can be increased by arranging the Hall device 116 at a position where the magnetic flux penetrating the Hall device is maximally changed with the rotor rotation.

Further, the rotor magnet 108 is multipolar-magnetized such that different magnetic poles are alternating in the circumferential direction and in the radial direction. In a cross-section of the rotor magnet 108 shown in FIG. 6, the radially inner side of the rotor magnet is magnetized into an N (or S) pole and the radially outer side thereof is magnetized into an S (or N) pole. Then, lines of magnetic force generated by the rotor magnet 108 are radially extended from both poles and are deflected, to a large extent, depending on the arrangement of magnetic bodies disposed in the surroundings of the rotor magnet. It is usually thought that the sensitivity in detecting the rotor rotation is increased by arranging the Hall device in a position directly below, and closer to, the rotor magnet. In positions away from the position directly below the rotor magnet, the rotation detection sensitivity is reduced, while it is relatively increased by arranging the Hall device in a position where the lines of magnetic force are concentrated (and hence the density of magnetic flux is relatively high).

Recently, notebook personal computers capable of handling CD-ROMs or the like have been commercialized. The size and thickness of these disk drives for driving CD-ROMs or the likes have been reduced. Correspondingly, there is a demand for a reduction in the size and thickness of the brushless motors that are to be incorporated in these disk drives.

However, because the Hall device 116 is disposed directly below the rotor magnet 108, as shown in FIG. 6, the presence of the Hall device 116 impedes an attempt at reducing the motor thickness in the axial direction.

On the other hand, when attempting to move the position of the Hall device 116 radially inward of the rotor magnet 108 to avoid such a drawback, there is not sufficient space to accommodate the Hall device, because the stator windings 114 are disposed radially inward of the rotor magnet as shown in FIG. 7. Also, even if there is sufficient space, it would be difficult to precisely detect the rotor rotation because, in a position away from the rotor magnet, the density of magnetic flux is reduced and, therefore, the sensitivity in detecting the rotor rotation is reduced.

SUMMARY OF THE INVENTION

It is an object of the present invention to provide a brushless motor, in which a rotor position detecting device is able to detect changes in the density of magnetic flux that are caused by rotation of a rotor magnet, while reducing the size and thickness of the motor.

According to the present invention, a brushless motor includes a rotor position detecting device disposed between stator teeth, rather than directly below a rotor magnet, so that the distance between a lower end of a rotor magnet and a stationary frame is minimized. This results in a thinner brushless motor than conventional designs. In the preferred embodiment of the present invention, the rotor position detecting device is a Hall device.

Further, according to the present invention, the windings are wound over a stator in larger number on the inner peripheral side than they are on the outer peripheral side thereof. However, the total number of stator windings remains substantially equal to that in a conventional motor, so that sufficient space to accommodate the Hall device is defined between the adjacent teeth of a stator core.

In addition, the Hall device that is disposed in such a space is fixed in a position where the lines of magnetic force generated from the rotor magnet are concentrated (and hence the density of magnetic flux is relatively high), and the magnetically sensitive surface of the Hall device is inclined with respect to the axial direction of a shaft of the motor. This arrangement enables the Hall device to receive the most possible magnetic flux generated during the rotation of the rotor magnet. As a result, the Hall device can detect, with satisfactory accuracy, the timing of switching in a stator current supplied to the brushless motor.

With the arrangements described above, the present invention has succeeded in reducing the size and thickness of the brushless motor.

DESCRIPTION OF THE PREFERRED EMBODIMENTS

Figure 1:
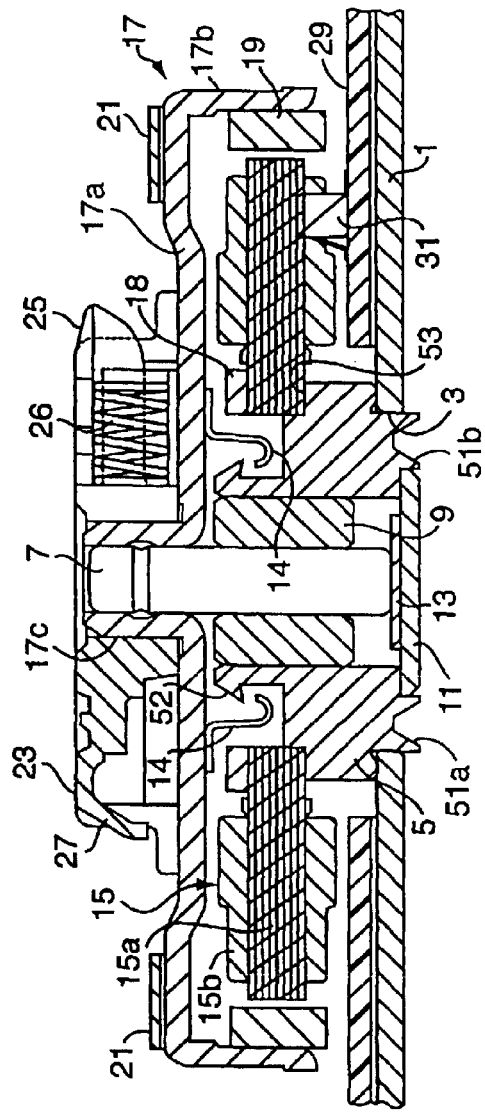
FIG. 1 is a sectional view of a brushless motor, according to the present invention.
Figure 2:
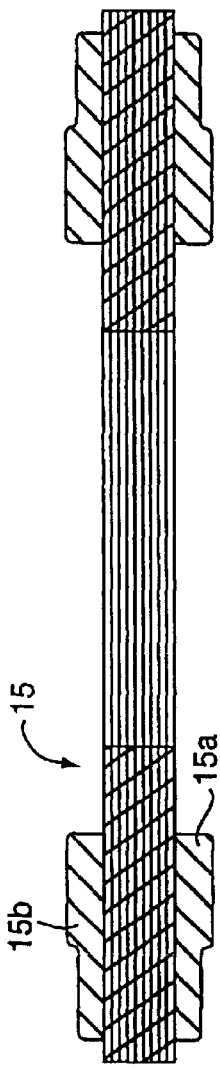
FIG. 2 is a sectional view of a stator of the brushless motor of FIG. 1.

FIG. 1 is a sectional view of a brushless motor for driving a disk according to one embodiment of the present invention, and FIG. 2 is a sectional view of a stator used in the brushless motor.

It is to be noted that the "vertical direction" used in the following description of one embodiment of the present invention implies the vertical direction as defined on each of the drawings for the sake of convenience, but that the direction of the brushless motor as actually mounted is not limited to the illustrated direction.

The brushless motor for driving a disk according to the described embodiment illustrates a motor used in a disk drive for a CD-ROM or the like. The brushless motor comprises a frame 1, a bushing 5 fixed to the frame 1 to stand in the vertical direction, a sleeve bearing 9 fitted to the bushing 5, a shaft 7 rotatably supported by the sleeve bearing 9, and a substantially cup-shaped rotor 17.

The frame 1, serving as a stationary member, has a central hole 3 formed therein, and the bushing 5 is fitted to the central hole 3. The bushing 5 is fabricated from a magnetic material, such as iron or stainless steel, and has a substantially cylindrical shape. The bushing 5 is fixed to the frame 1 by plastically deforming a caulked portion 51a, which is formed at a lower end of the bushing 5, toward the outer peripheral side. The sleeve bearing 9 is fitted to an inner periphery of the bushing 5 on the upper side, and a closing plate 11 is attached to a lower end of the bushing 5 to enclose a bottom opening of the bushing 5. A disk-shaped thrust bearing plate 13 is attached to an upper surface of the closing plate 11, and the thrust bearing plate 13 and the closing plate 11 are both fixed to the bushing 5 by plastically deforming a caulked portion 51b, which is formed at the lower end of the bushing 5, toward the inner peripheral side.

A projection 52 is formed at the upper end of the bushing 5 and extends outwardly from its outer periphery. A hook 14 is attached to an inner portion of a rotor 17 so that it is capable of engaging the projection 52, whereby the amount of axial movement of both the shaft 7 and the rotor 17 is restricted.

The rotor 17, serving as a rotating member, is formed of a magnetic material, such as iron, by pressing. The rotor 17 comprises an upper wall portion 17a, a peripheral wall portion 17b extending downward from an outer periphery of the upper wall portion 17a, and a boss portion 17c erected at the center of the upper wall portion 17a and having a circular bore formed through the boss portion 17c. Then, the boss portion 17c is fitted over an upper portion of the shaft 7 so that the shaft 7 and the rotor 17 are rotated in union with each other.

An upper surface of the upper wall portion 17a of the rotor 17 serves as a loading portion on which a disk, such as a CD-ROM, is loaded. A buffer member 21 is attached to an upper surface of an outer peripheral portion of the upper wall portion 17a, and a disk (not shown) is placed on the upper wall portion 17a with the buffer member 21 interposed therebetween.

Further, a center boss 23 formed of a nonmagnetic material and fitted to a center hole of the disk is mounted to the boss portion 17c of the rotor 17. The center boss 23 is provided with a plurality of chucks 25 which are movable in the radial direction and are arranged at equal angular intervals. Each of the chucks 25 is urged radially outward by a spring 26 disposed inside the chuck 25. Accordingly, when the center hole of the disk is fitted to the center boss 23, an inner peripheral edge of the disk pushes the chucks 25 radially inward against the biasing forces of the springs 26 acting radially outward. Then, when the disk is loaded in a position where it contacts the buffer member 21, a distal end of each chuck 25 is positioned over an upper surface of an inner peripheral portion of the disk around the center hole, whereupon the chuck 25 now presses the disk against the upper wall portion 17a of the rotor 17 by the biasing force of the spring 26 acting radially outward. As a result, the disk is properly placed on the upper wall portion 17a of the rotor 17. In addition, the center boss 23 is provided with a plurality of center aligning fingers 27 positioned between the chucks 25 in the circumferential direction. Upon loading of the disk, the center aligning fingers 27 contact the inner peripheral edge of the disk for center alignment of the disk.

The structure constituting the features of the present invention will now be described in detail with reference to FIGS. 1, 2, 3 and 4.

As shown in FIG. 1, a cylindrical rotor magnet 19 is attached to an inner surface of the peripheral wall portion 17b of the rotor 17 and is positioned to face the stator 15 with a very small gap left between them in the radial direction. The stator 15 comprises a stator core 15a and windings 15b wound over teeth (not shown) projecting from a base portion of the stator core 15a in a radial pattern. The stator 15 is fitted to a stepped portion 53 formed in an upper outer peripheral portion of the bushing 5. Further, an annular magnet 18 is attached to an upper surface of the base portion of the stator core 15a. The annular magnet 18 is positioned to face the upper wall portion 17a of the rotor 17 in the axial direction for applying a magnetic bias to the rotor 17.

As shown in FIG. 2, by way of example, the windings 15b are wound such that the number of windings is larger on the inner peripheral side than on the outer peripheral side. With this arrangement, a space sufficient to accommodate a Hall device 31 is ensured between the adjacent teeth of the stator core 15a.

Corresponding to those spaces, a plurality of Hall devices 31 are attached to a circuit board 29 that is disposed on the frame 1. In this embodiment, since the number of teeth of the stator core 15a is 12 and the windings 15b are wound in 3 phases, three Hall devices 31 are disposed between three pairs of the adjacent teeth of the stator core 15a.

Figure 3:
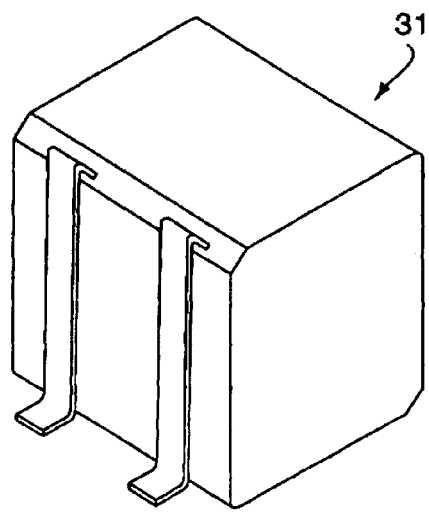
FIG. 3 is a perspective view of a Hall device of the brushless motor of FIG. 1.
Figure 4:
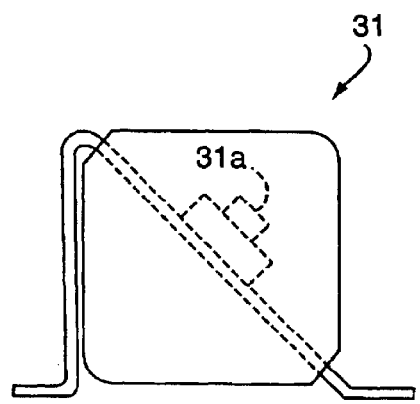
FIG. 4 is a side view of the Hall device of FIG. 3.

Further, as shown in FIGS. 3 and 4, the Hall devices 31 are each fixed in the above-mentioned space at a position where magnetic flux is maximally changed with the rotor rotation, and the magnetically sensitive surface 31a of each Hall device 31 is inclined at a predetermined angle with respect to the axial direction of the shaft 7. The predetermined angle is selected to a value at which magnetic flux is maximally changed with the rotor rotation. With this arrangement, in spite of the Hall device being fixed to a location away from the position directly below the rotor magnet 19, the Hall device can detect, with satisfactory accuracy, changes in the density of magnetic flux caused by the rotation of the rotor magnet 19. Consequently, not only the stator current can be switched using the detected result to make the rotor rotate accurately, but also the rotor magnet 19 can be positioned closer to the upper surface of the frame 1, with the circuit board 29 interposed between them. The resulting brushless motor has a smaller thickness than a conventional one.

As described above, by winding the windings 15b over the stator core 15a in a larger number on the inner peripheral side than on the outer peripheral side thereof, while keeping the total number of the stator windings 15b wound over each tooth of the stator core 15a substantially equal to that in the conventional motor, a space sufficient to accommodate the Hall device 31 is defined between the adjacent teeth of the stator core. Such unevenness in the number of windings can be realized by estimating a position where the sensitivity in detecting the rotor rotation is maximized by arranging the Hall device 31 in that position, and determining a manner of winding the windings, with which the space is created in that position. By thus ensuring the space, it is possible to adjust the position where the Hall device 31 is to be fixed.

Figure 5:
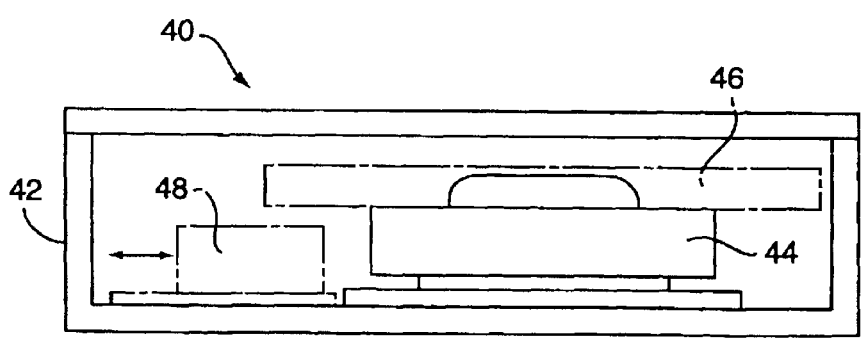
FIG. 5 is a sectional view of a disk drive with the brushless motor of FIG. 1 disposed therein.
Figure 6:
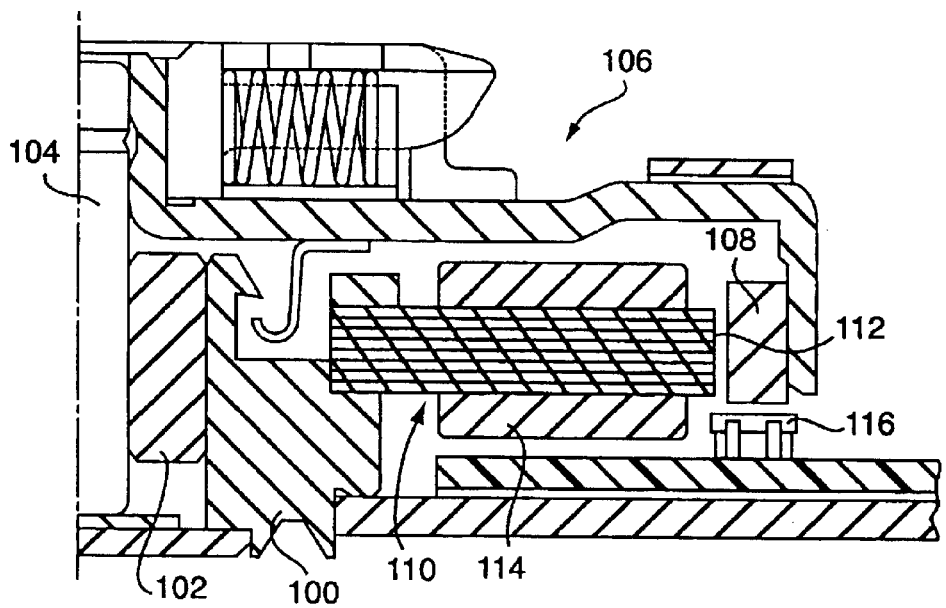
FIG. 6 is a sectional view of a portion of a conventional brushless motor.
Figure 7:
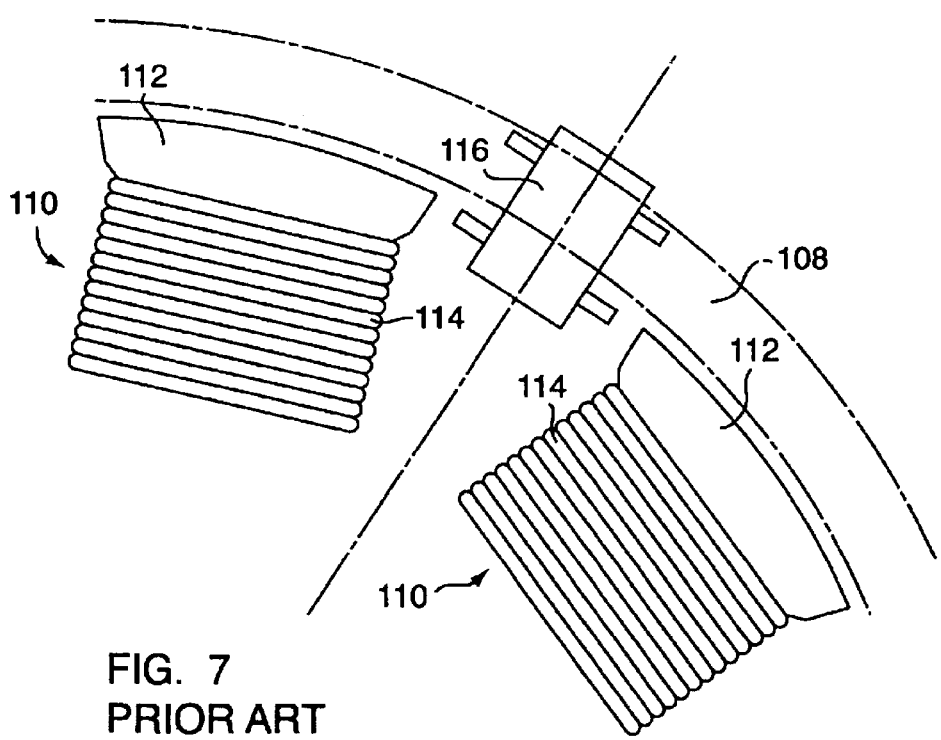
FIG. 7 is a plan view of a portion of the conventional brushless motor of FIG. 6.

The inner construction of a general disk drive 40 will now be described with reference to FIG. 5. The disk drive 40 comprises a housing 42, a brushless motor 44 fixedly disposed within the housing 42, a removable disk 46 having the shape of a circular plate and held on the brushless motor 44, and a pickup device 48 for writing and/or reading information in and/or from a predetermined position on the disk 46 during the motor rotation.

While one embodiment of the present invention has been described above, the present invention is not limited to the above-mentioned embodiment, but can be modified in various ways.

For example, the above-mentioned embodiment uses the Hall device 31 having the magnetically sensitive surface 31a inclined with respect to the axial direction of the shaft 7. However, a Hall device having a magnetically sensitive surface parallel to the axial direction of the shaft may also be used.

Further, while a Hall device is used as a rotational position detecting means in the above description, the rotational position detecting means is not limited to the Hall device.

Moreover, the embodiment has been described in connection with the disk driving motor of the so-called outer rotor type in which the rotor magnet 19 is disposed on the side radially outward of the stator 15. However, the present invention is also applicable to a disk driving motor of the so-called inner rotor type in which a rotor magnet is disposed on the radially inward side of a stator. In such a case, similar advantages in operation to those in the above-mentioned embodiment can also be obtained.

Additionally, while the embodiment of the present invention has been described in connection with the disk driving motor, the applicable range of the present invention is not limited to the field related to driving of disks. The present invention can also be employed in other various fields of applications, and similar advantages in operation to those in the above-mentioned embodiment can be obtained.

What is claimed is:

1. A brushless motor comprising:

a frame;

a rotor rotatably supported by said frame;

a rotor magnet fixed to said rotor;

a stator fixed onto said frame, said stator being spaced away from said rotor magnet to define a gap therebetween, said stator having a substantially annular base portion and a plurality of teeth circumferentially adjacent to each other and projecting from said annular base portion toward said rotor magnet with stator windings wound over each of said plurality of teeth; and a rotor rotational position detecting device disposed between the adjacent teeth of said stator;

wherein said stator windings are unevenly wound over said teeth to define a space adapted to accommodate said rotor rotational position detecting device therein.

2. The brushless motor according to claim 1, wherein said rotor rotational position detecting device is disposed away from an area directly below said rotor magnet.

3. The brushless motor according to claim 1, wherein said rotor rotational position detecting device is spaced away from said rotor magnet.

4. The brushless motor according to claim 1, wherein said rotor rotational position detecting device is located in a place where a magnetic flux generated by said rotor magnet is maximally changed with the rotor rotation.

5. The brushless motor according to claim 1, wherein said rotor rotational position detecting device is located in a place where a magnetic flux change caused by the rotor rotation is sufficient for a stator current to be switched to make the rotor rotate accurately.

6. The brushless motor according to claim 1, wherein said rotor rotational position detecting device is a Hall device.

7. The brushless motor according to claim 6, wherein said Hall device has a magnetic-flux sensitive surface inclined with respect to a surface of said frame.

8. The brushless motor according to claim 7, wherein said Hall device has a magnetic-flux sensitive surface inclined at an angle with respect to a surface of said frame, and the angle is determined by selecting an angle value where a magnetic flux change caused by the rotor rotation is sufficient for a stator current to be switched to make the rotor rotate accurately.

9. The brushless motor according to claim 7, wherein said Hall device has a magnetic-flux sensitive surface inclined at an angle with respect to a surface of said frame, and the angle is determined by selecting an angle value where a magnetic flux generated by the rotor magnet is maximally changed with the rotor rotation.

10. The brushless motor according to claim 1, wherein said windings are wound unevenly in a radial direction.

11. The brushless motor according to claim 10, wherein said stator windings are wound in less number over a distal end portion of said teeth in the radial direction.

12. The brushless motor according to claim 1, wherein said rotor rotational position detecting device is fixed onto or over said frame.

13. The brushless motor according to claim 12, further comprising a circuit board disposed between said rotor rotational position detecting device and said frame.

14. A disk drive having a disk for reading and/or writing information, comprising:

a housing;

a brushless motor fixed to said housing; and information access means for writing and/or reading information in and/or from a predetermined position on said disk, said brushless motor comprising:

a frame;

a rotor rotatably supported by said frame;

a rotor magnet fixed to said rotor;

a stator fixed onto said frame, said stator is spaced away from said rotor magnet to define a gap therebetween, said stator comprising a substantially annular base portion and a plurality of teeth circumferentially adjacent to each other and projecting from said annular base portion toward said rotor magnet with stator windings wound over each of the teeth; and a rotor rotational position detecting device fixed onto or over said frame and disposed between the adjacent teeth of said stator;

wherein said stator windings are unevenly wound over said teeth to define a space in which said rotor rotational position detecting device is to be disposed.

15. The disk drive according to claim 14, wherein said rotor rotational position detecting device is disposed away from an area directly below said rotor magnet.

16. The disk drive according to claim 14, wherein said rotor rotational position detecting device is located in a place where a magnetic flux change caused by the rotor rotation is sufficient for a stator current to be switched to make the rotor rotate accurately.

17. The disk drive according to claim 14, wherein said rotor rotational position detecting device is a Hall device.

18. The disk drive according to claim 17, wherein said Hall device has a magnetic-flux sensitive surface inclined with respect to a surface of said frame.

19. The disk drive according to claim 17, wherein said Hall device has a magnetic-flux sensitive surface inclined at an angle with respect to a surface of said frame, and the angle is determined by selecting an angle value where a magnetic flux change caused by the rotor rotation is sufficient for a stator current to be switched to make the rotor rotate accurately.

20. The disk drive according to claim 14, wherein said stator windings are wound in less number over a distal end portion of said teeth in a radial direction.

* * * * *